US006708170B1

United States Patent
Byrne et al.

(10) Patent No.: US 6,708,170 B1
(45) Date of Patent: Mar. 16, 2004

(54) METHOD AND SYSTEM FOR USAGE OF NON-LOCAL DATA WITHIN A LIGHTWEIGHT DIRECTORY ACCESS PROTOCOL DIRECTORY ENVIRONMENT

(75) Inventors: Debora Jean Byrne, Austin, TX (US); John Michael Garrison, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/460,849

(22) Filed: Dec. 14, 1999

(51) Int. Cl.⁷ .................. G06F 17/30; G06F 15/173
(52) U.S. Cl. .................................... 707/9; 709/223
(58) Field of Search .................. 707/9, 104.1, 10, 707/2; 709/223, 217, 218, 219

(56) References Cited

U.S. PATENT DOCUMENTS

| | | | | |
|---|---|---|---|---|
| 6,209,036 B1 | * | 3/2001 | Aldred et al. | 709/229 |
| 6,321,259 B1 | * | 11/2001 | Ouellette et al. | 709/220 |
| 6,490,619 B1 | * | 12/2002 | Byrne et al. | 709/223 |
| 6,539,021 B1 | * | 3/2003 | Kennelly et al. | 370/401 |

OTHER PUBLICATIONS

Hassler "X.500 and LDAP security: a comparative overview", IEEE 1999, pp. 54–64.*
Berchtold et al "SaveMe: a system for archiving electronic documents using messaging groupware", ACM 1999, pp. 167–176.*
Cluet et al "Using LDAP directory caches", ACM 1999, pp. 273–284.*

* cited by examiner

Primary Examiner—Uyen Le
(74) Attorney, Agent, or Firm—Duke W. Yee; Leslie A. Van Leeuwen; Cathrine K. Kinslow

(57) ABSTRACT

A process for maintaining authentication information in a distributed network of servers generates and maintains a non-local access server list, queries non-local servers using a Lightweight Directory Access Protocol (LDAP) search request, caches responses to queries from non-local servers, updates the cached directory entries and applies an LDAP operation to the cached directory entries and the local access control data. A variety of techniques are used to update cache information. When a request to authenticate a user with a distinguished name is received, the cached directory entries and the local access control data are searched for the distinguished name and, once the distinguished name is located, the user is authenticated with each server in the non-local access server list.

36 Claims, 7 Drawing Sheets

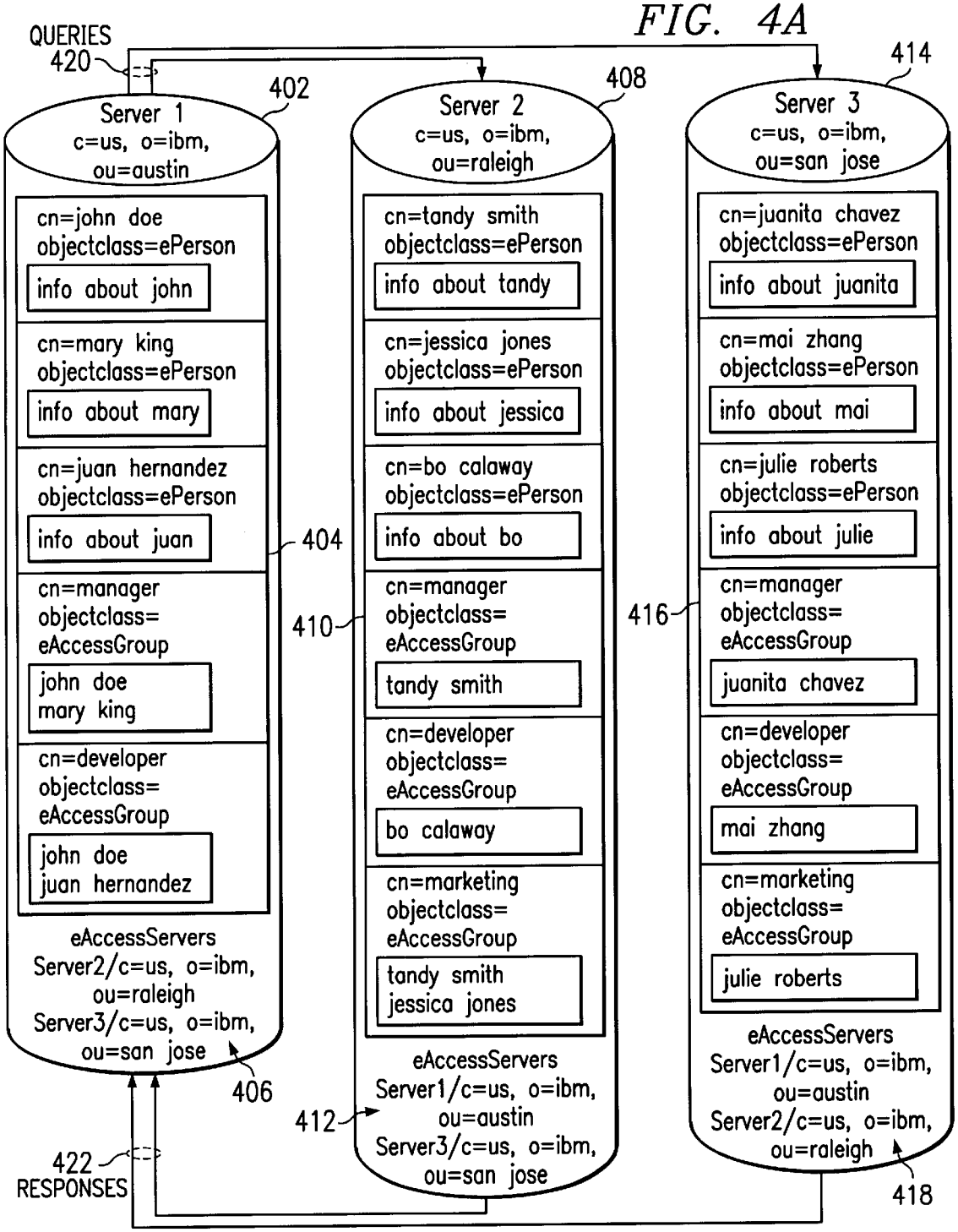

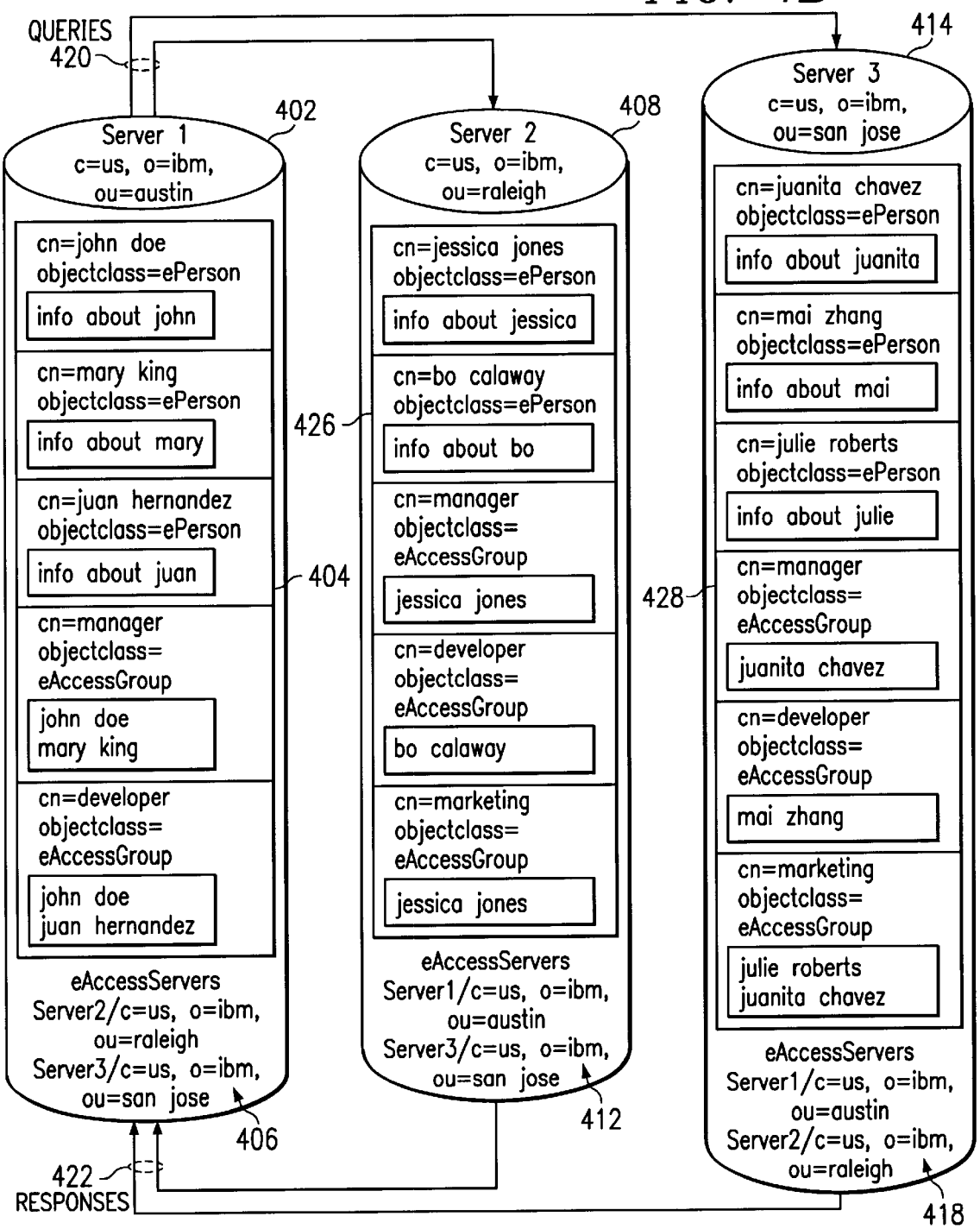

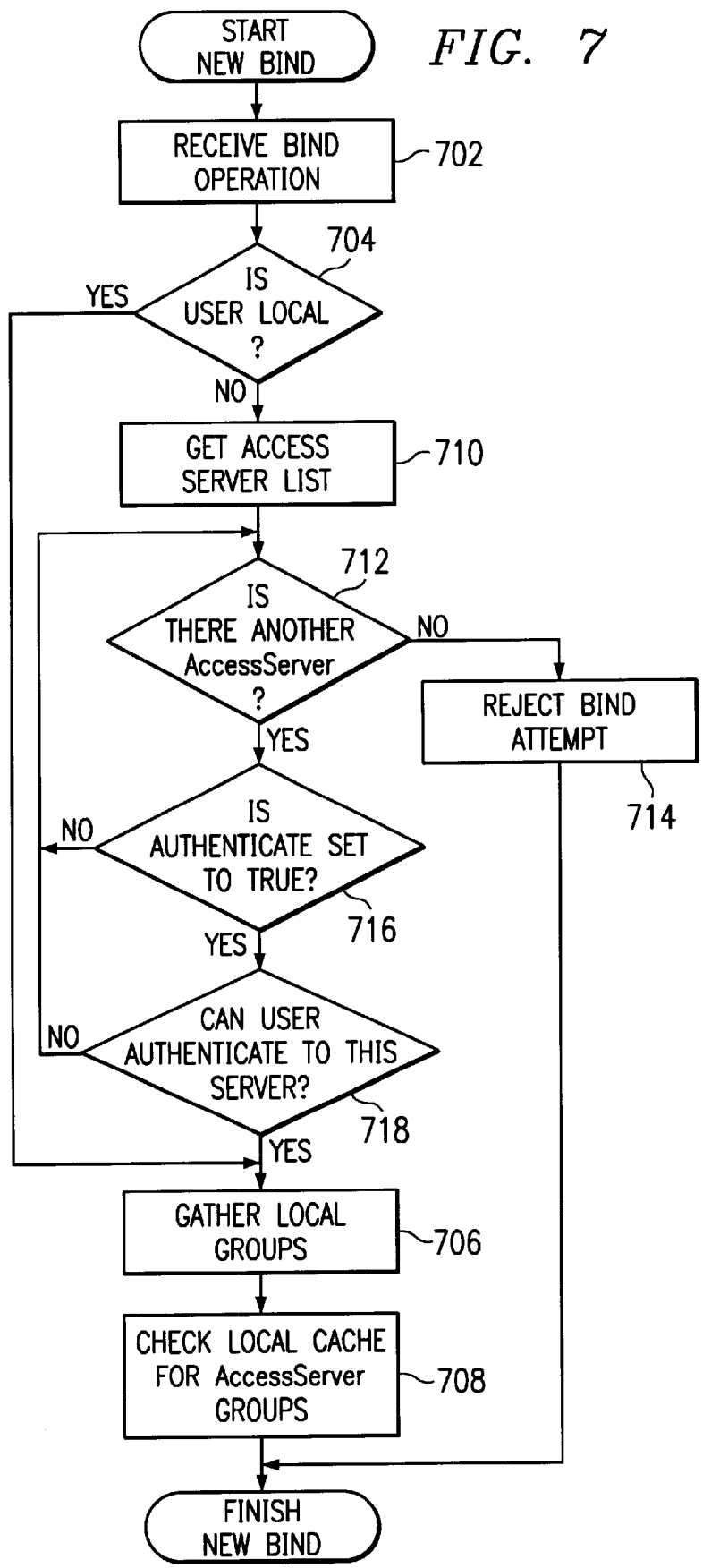

METHOD AND SYSTEM FOR USAGE OF NON-LOCAL DATA WITHIN A LIGHTWEIGHT DIRECTORY ACCESS PROTOCOL DIRECTORY ENVIRONMENT

FIELD OF THE INVENTION

The present invention relates generally to an improved distributed data processing system and in particular to an improved method and apparatus for accessing information in a distributed system.

BACKGROUND OF THE INVENTION

A directory service is a central point where network services, security services and applications can form an integrated distributed computing environment. Typical uses of a directory service may be classified into several categories. A "naming service", such as Directory Naming Service (DNS) or Cell Directory Service (CDS), uses the directory as a source to locate an Internet Host address or the location of a given server. A "user registry", such as Novell Directory Services (NDS), stores information about users in a system comprised of a number of interconnected machines. Still another directory service is a "white pages" lookup provided by some mail clients, such as Netscape Communicator or Lotus Notes.

With more and more applications and system services demanding a central information repository, the next generation directory server will need to provide system administrators with a data repository that can significantly ease administrative burdens. In the Internet/intranet environment, it will be required to provide user access to such information in a secure manner. It will be equally important to provide robust and simple administrative tools to manage the directory content.

Lightweight Directory Access Protocol (LDAP) is a software protocol for providing directory service enablement to a large number of applications. These applications range from e-mail to distributed system management tools. LDAP is an evolving protocol model based on the client-server model in which a client makes a TCP/IP connection to an LDAP server. LDAP is a "lightweight" version of DAP (Directory Access Protocol), which is part of X.500, a standard for directory services in a network.

The LDAP information model in particular, is based on an "entry", which contains information about some object. Entries are typically organized in a specified tree structure, and each entry is composed of attributes. An example LDAP directory is organized in a simple "tree" hierarchy consisting of the following levels:

The "root" directory is the starting place or the source of the tree.

Countries are designated by two letter codes, such as US for the United States of America.

Organizations can be private companies, government units, and so forth.

Organizational units are divisions, departments, and so forth.

Individuals include people, files, and shared resources such as printers.

LDAP provides a number of known functions for manipulating the data in the information model. These include search, compare, add, delete, and edit. It provides a rich set of searching capability with which users can assemble complex queries to return desired information for later viewing and updating.

An LDAP directory can be distributed among many servers, with parts of data residing on a set of machines. Another scenario has each server containing a replicated version of the total directory that is synchronized periodically. An LDAP server is called a Directory System Agent (DSA). An LDAP server that receives a request from a user takes responsibility for the request, passing it to other DSAs as necessary, either through server chaining or client referrals. Both cases ensure a single coordinated response for the user. Although directory structures can reside on a single server, there are several reasons for splitting directories across multiple machines. First, the directory may be too large to make it practical to store on a single server. Second, network administrators may want to keep the physical location of the server close to the expected clients to minimize network traffic.

A referral is used to show where a parent tree may be located. LDAP provides a mechanism for searching directories and for "chasing" referrals. However, the LDAP model does not address issues such as authentication. The LDAP servers contacted while retrieving information must recognize the user registry information.

One approach to solving the authentication problem is to use a client push model, as found in the Distributed Computing Environment (DCE) developed by the Open Group. The user registers with a first server and receives credentials, which include group membership. When accessing resources on a second server, these credentials are presented. The second server either accepts or denies the credentials after verifying their validity through a series of challenges. Windows NT uses a similar client push model.

Another approach to authentication is to define all of the group and user registry information on each machine, as done in a local area network (LAN). Within a domain, each server maintains a copy of authentication information through replication. A separate set of credentials must be maintained for a second domain.

If a directory is distributed over multiple servers, each server must maintain a copy of authentication information, such as group membership. To maintain identical objects in multiple locations uses excess space and leads to administrative problems when changes are made.

Both approaches to solving the authentication problem have drawbacks. Therefore, it would be advantageous to have an improved method that allows any server to use entry and resource information defined on some other LDAP server.

SUMMARY OF THE INVENTION

A method, apparatus, and instructions for maintaining authentication information in a distributed network of servers using Lightweight Directory Access Protocol (LDAP) directories is provided. A process generates and maintains a non-local access server list, queries non-local servers using an LDAP search request, caches responses to queries from non-local servers, updates the cached directory entries, and applies an LDAP operation to the cached directory entries and the local access control data. Customizable LDAP search filters can be applied when conducting a search. A variety of techniques are used to update cache information, such as re-querying each server in the non-local access server list after a predetermined time period. When a request to authenticate a user with a distinguished name is received, the cached directory entries and the local access control data are searched for the distinguished name and, once the distinguished name is located, the user is authenticated with each server in the non-local access server list.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 4A and 4B show a local cache of group information before and after a change in the directory entries in accordance with a preferred embodiment of the present invention;

FIG. 7 is a flowchart showing the bind procedure with a local groups cache in accordance with a preferred embodiment of the present invention.

DETAILED DESCRIPTION OF THE PREFERRED EMBODIMENT

Figure 1:
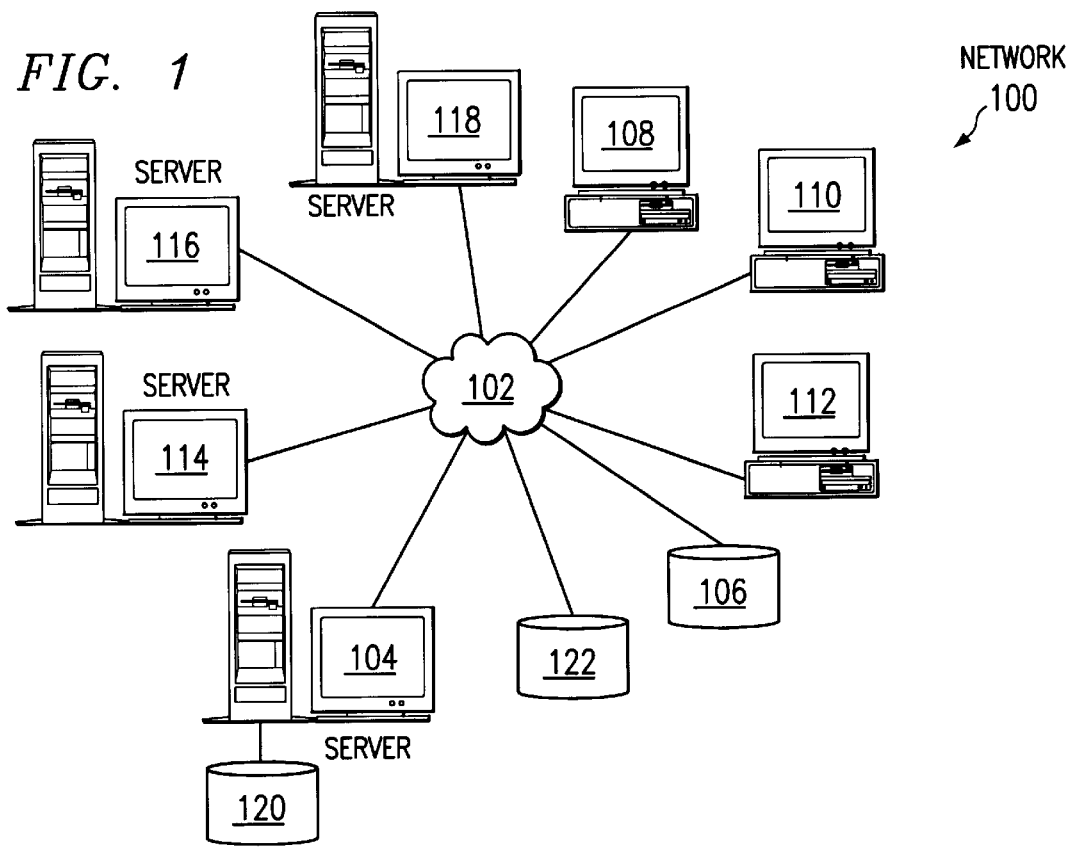
FIG. 1 is a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage units 106 and 122. Storage units 106 and 122 are also connected to network 102. Storage unit 120 is directly coupled to server 104. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not is an architectural limitation for the present invention.

Figure 2:
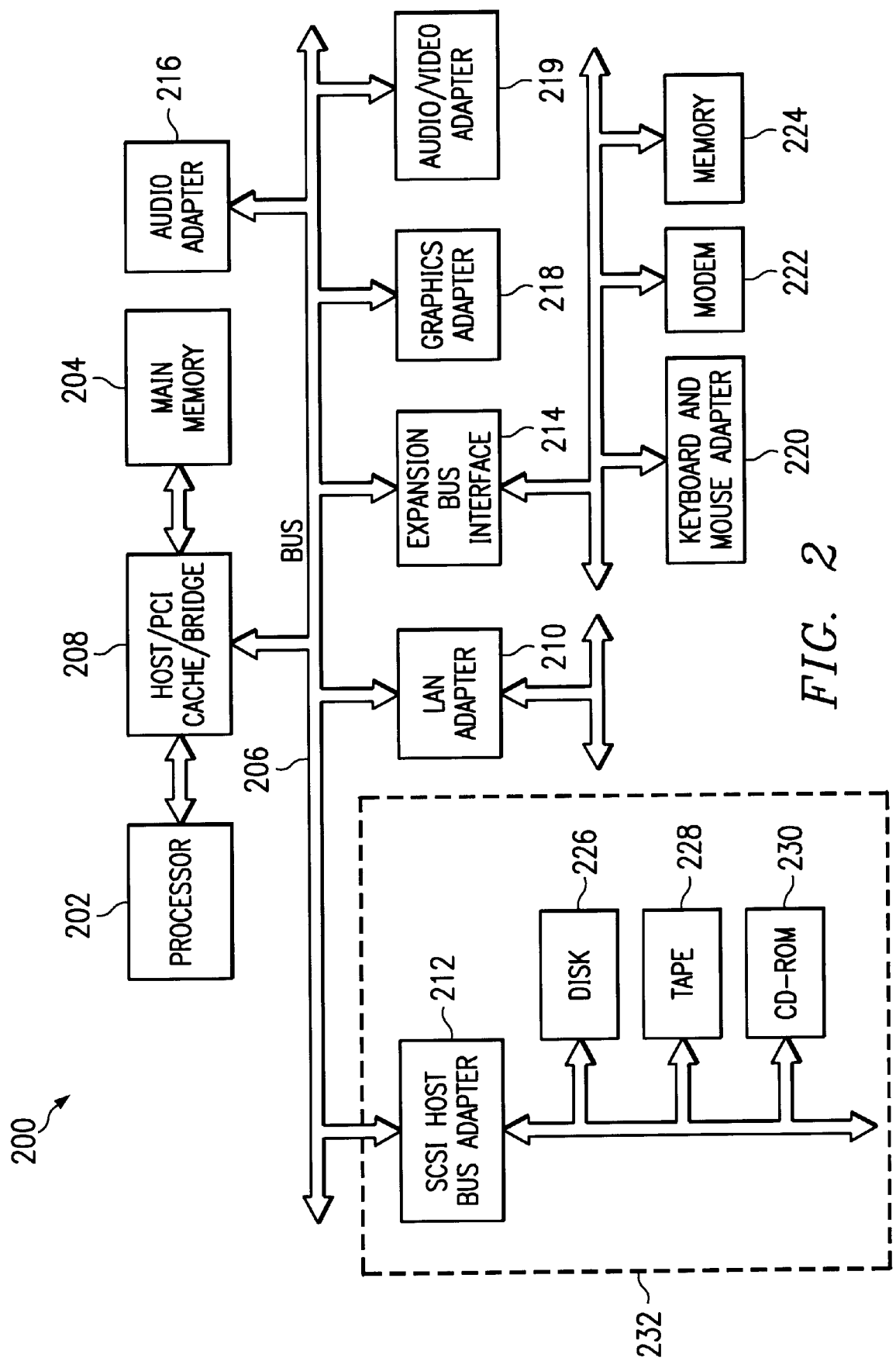
FIG. 2 is a block diagram of a data processing system that may be implemented as a client or server.

With reference now to FIG. 2, a block diagram illustrates a data processing system in which the present invention may be implemented. Data processing system 200 is an example of a computer, such as computer 108 in FIG. 1, in which code or instructions implementing the processes of the present invention may be located. Data processing system 200 employs a peripheral component interconnect (PCI) local bus architecture. Although the depicted example employs a PCI bus, other bus architectures such as Micro Channel and Industry Standard Architecture (ISA) may be used. Processor 202 and main memory 204 are connected to PCI local bus 206 through PCI bridge 208. PCI bridge 208 also may include an integrated memory controller and cache memory for processor 202.

Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business Machines Corporation. "OS/2" is a trademark of International Business Machines Corporation. Instructions for the operating system, applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. The depicted example in FIG. 2 and above-described examples are not meant to imply architectural limitations.

Figure 3:
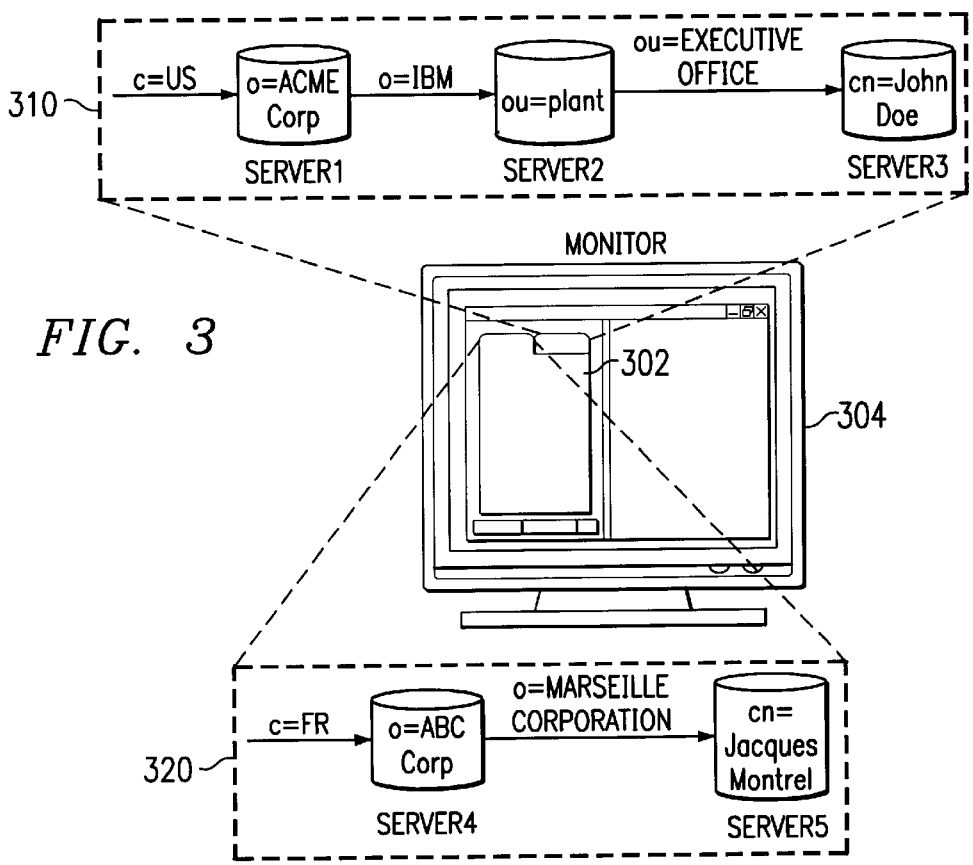
FIG. 3 is a diagram showing access to LDAP referral links.

With reference now to FIG. 3, a diagram shows two LDAP referral chains. Referral chain 310, the topmost referral chain, starts off with country code "c=US", organization "o=ACME Corporation", which leads to server1. This server is for "o=ACME Corporation", but the desired link is for "o=IBM". This results in a referral to server2. This server is for organizational unit "ou=plant", but the desired link is for "ou=Executive Office". This leads to a final referral to server3 where the item with common name "cn=John Doe" is found. Client program 302 shown on monitor 304 is dependent on the LDAP server to follow these referrals.

Not all of the possible links need to be specified.

In referral chain 320, the second referral chain, the country is France, "c=FR", leading to server4. This server is for "o=ABC Corp", but the desired link is for "o=Marseille Corporation". This results in a referral to server5 where the item with common name "cn=Jacques Montrel" is found. Notice there was no organization unit as compared with referral chain 310. Both referrals are being accessed by client program 302 shown on monitor 304.

In the present invention, access groups are used as an access control mechanism within a directory. The distinguished name (DN) for an object of type "access group" may be used in an access control list to grant access permissions to members of that group. In referral chain 310, the distinguished name in the example is (c=US, o=IBM Corporation, ou=Executive Office, cn=John Doe).

When a user authenticates to a directory, the authenticating server assembles the group information for that user. Note that this differs considerably from the DCE mechanisms where the client pushes the group information to the server.

The authenticating server queries the distributed directories for objects of type 'eAccessGroup' to which the user belongs. The returned set of DNs is used by the access control subroutines throughout the lifetime of the connection as the set of access groups for that user. If the user attempts to access an object in the database, the access control routines check to see if the user is given permission to access that object, or if the user belongs to a group which is given permission to access that object.

Before discussing the processes of the present invention with respect to the flowcharts, it is useful to depict pictorially a representative operation performed by the present invention.

With reference now to FIG. 4A, a figure shows the collection of a local cache of group information distributed throughout the system of three servers. Server1 402 is located in Austin and has data for "c=us", "o=ibm", "ou=austin". Data 404 has three common names: "john doe", "mary king", and "juan hernandez", each with objectclass=ePerson. There is other information stored about each person. Data 404 also contains group information for the manager group with attributes including member="john doe" and member="mary king", and group information for the developer group with member="john doe" and member="juan hernandez". Notice that one person can belong to more than one group. Also, although not shown here, a person may belong to no groups. Server1 402 also contains a list of eAccessServers 406, which includes servers for raleigh and san jose. This information has been gathered from the distributed directories and put into list form.

Server2 408 is located in Raleigh and its database 410 includes three common names: "tandy smith", "jessica jones", and "bo calaway". Database 410 contains the manager group includes "tandy smith", the developer group includes "bo calaway", and the marketing group includes "tandy smith" and "jessica jones". The eAccessServers list 412 includes "austin" and "san jose".

Server3 414 is located in San Jose and its database 416 includes three common names: "juanita chavez", "mai zhang", and "julie roberts". Database 416 also contains three groups—the manager group includes "juanita chavez", the developer group includes "mai zhang", and the marketing group includes "julie roberts". The eAccessServers list 418 includes "austin" and "raleigh".

Server1 402 needs to build a local cache of group information for all three servers. It uses eAccessServers list 406 to send queries 420 to Server2 408 and to Server3 414. The filter would include objectclass=eAccessGroup so that only information about groups is returned. Server2 408 and Server3 414 send responses 422 containing group information and associated attributes back to Server1 402. As a particular example, "cn=manager", "ou=raleigh", "o=ibm", "c=us" might have associated attributes (objectclass: eAccessGroup), (Description: group of managers), (member: "cn=tandy smith, ou=raleigh, o=ibm, c=us"). Queries 420 can specify that all attributes be returned or only a specified subset of attributes. As one of ordinary skill in the art will appreciate, there are a variety of ways to organize the database of information. Local cache of group information 424 on Server1 now contains the group information for the remote servers and, although not shown explicitly, has access to information about local groups on Server1.

With reference now to FIG. 4B, a figure shows the collection of a local cache of group information after some changes were made to the information presented in FIG. 4A. Specifically, "tandy smith", who was present in database 410 on Server2 408 in FIG. 4A, is no longer present in database 426 on FIG. 4B. This results in changes to group data: "tandy smith" was removed from the manager and marketing groups and "jessica jones" was added to the manager group.

Server3 414 also had a small change to database 428 with "juanita chavez" being added to the marketing group while remaining in the manager group. When Server1 402 updates its local cache of group information 430, "tandy smith" is no longer in the manager group and "jessica jones" has been added to the manager group. The developer group has no changes. "Tandy smith" has been removed from the marketing group and "juanita chavez" has been added to the marketing group. These figures illustrate that local changes to the group structures in Raleigh and San Jose result in changes to the local cache of group structures in Austin through periodic update of the cache structure.

Figure 5:
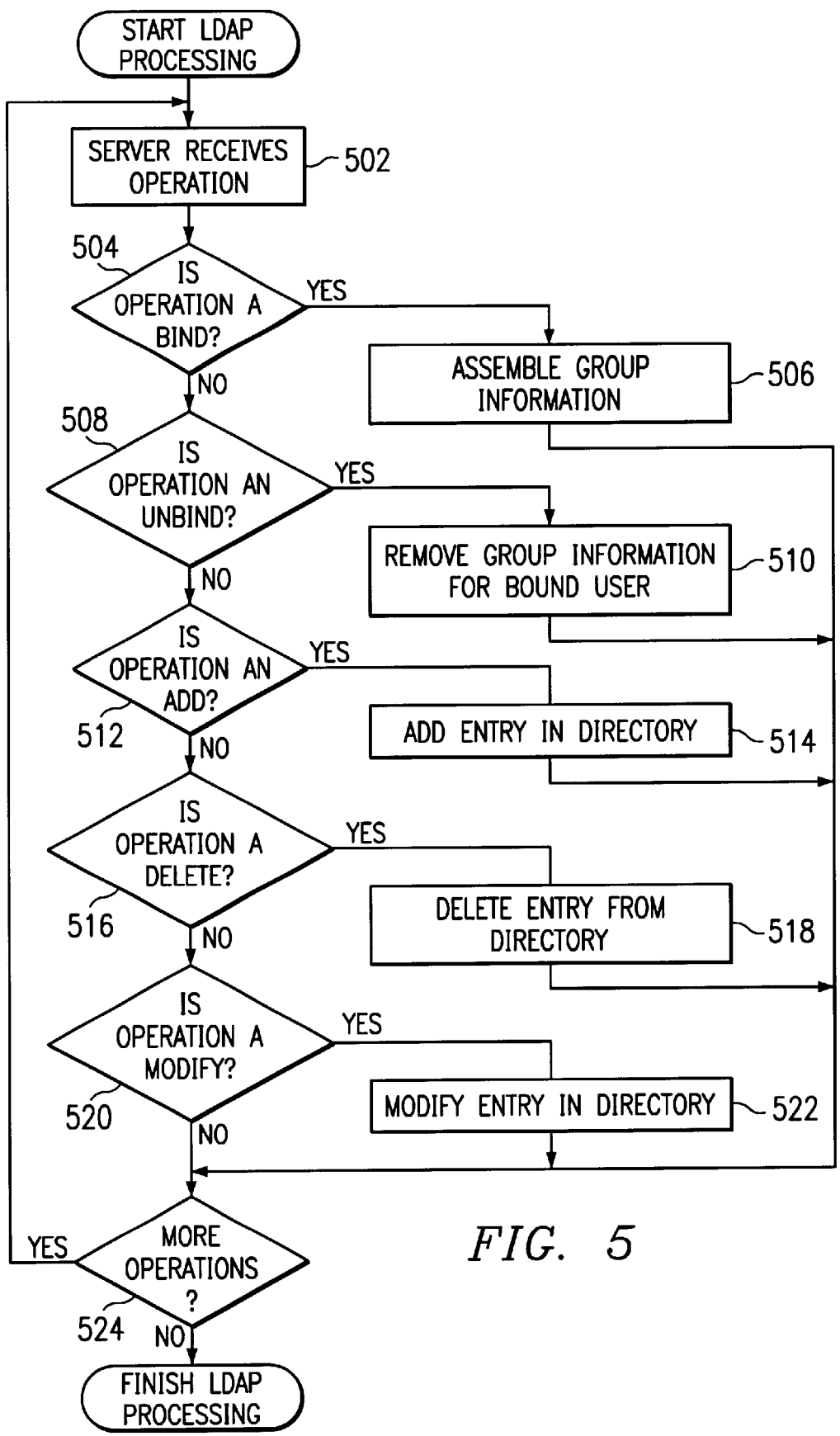
FIG. 5 is a flowchart showing the processing of LDAP operations in accordance with a preferred embodiment of the present invention.

With reference now to FIG. 5, a flowchart shows the choice between LDAP operations in accordance with the preferred embodiment of the invention. The server receives the desired operation (step 502). The software checks for each of the allowed operations, one-by-one. This flowchart illustrates processing for five operations: "bind", "unbind", "add", "delete", and "modify", although other operations are possible.

The first test is for the operation "bind" (step 504). If the operation is "bind", then group information is collected (step 506). This step is expanded in FIG. 7 described below. If at step 504 the operation is not "bind", then a check for the operation "unbind" is performed next (step 508). If the operation is "unbind", then the assembled group information is removed (step 510). If at step 508 the operation is not "unbind", then a check for the operation "add" is performed next (step 512). If the operation is "add", then the entry is added to the directory (step 514). If at step 512 the operation is not "add", then a check for the operation "delete" is performed next (step 516). If the operation is "deleteff, then the entry is deleted from the directory (step 518). If at step 516 the operation is not "delete", then a check for the operation "modify" is performed next (step 520). If the operation is "modify", then the entry in the directory is modified (step 518). Other operations are detected and performed in a similar manner. At step 524 there is a check if other operations are to be performed. If so, control is transferred back to step 502 where the operation is retrieved. If not, the processing of operations is complete.

In accordance with a preferred embodiment of the present invention, in order for one server to use group definitions found on another server, some sort of trust relationship must be established. This relationship is established by the directory server administrator. The administrator of a given LDAP server establishes a policy which states that group membership can be determined by looking at another server.

A new objectclass, call "eAccessServer" is used to describe the trusted servers. If the administrator of Server1 wants to use group definitions found on Server2, the administrator defines an object of type "eAccessServer" in the directory on Server1. Within this objectclass are several attributes which provide additional configuration information, such as what suffixes should be considered "trusted" on Server2.

Another attribute indicates if Server1 should use Server2 to perform actual authentication of a user. For instance, if a user binds to Server1, but the user is not defined in Server1, the server will check the eAccessServer definition for Server2 and see if the attribute "authenticate" is set to TRUE. If it is set to TRUE, Server1 will attempt to authenticate the user to Server2. If the authentication is successful, the user is considered authenticated at Server1 (where the initial bind took place), and the user is given access permissions as described below.

When a client authenticates to Server1, the server first searches for group information in the local database. Then, the server checks the cached information. If the user is defined within groups that are present in the cache, those groups are added to the list of groups which should be used for authorization purposes.

When the user accesses resources in the directory, the user can gain access by either the user DN, the local groups to which the user belongs, or the groups on Server2 to which the user belongs.

All of the information needed to access group information on Server2 is defined within the object added to the directory on Server1. This information includes the server and port definitions, the userId and password that may be used to bind and to authenticate the user and to retrieve the group information on Server2. Additionally, the filter used to retrieve all access control related groups on Server2 is stored. The default for this query is the SecureWay directory which retrieves all access groups: "objectclass= eAccessGroup".

The LDAP search filter may be specified by the user in order to allow greater interoperability between LDAP implementation. For example, a Netscape or proprietary directory might not use the same objectclass to define group information. By allowing the search filter to be user-specified, the appropriate search filter may be entered, thereby allowing non-homogeneous servers to interoperate.

Figure 6B:
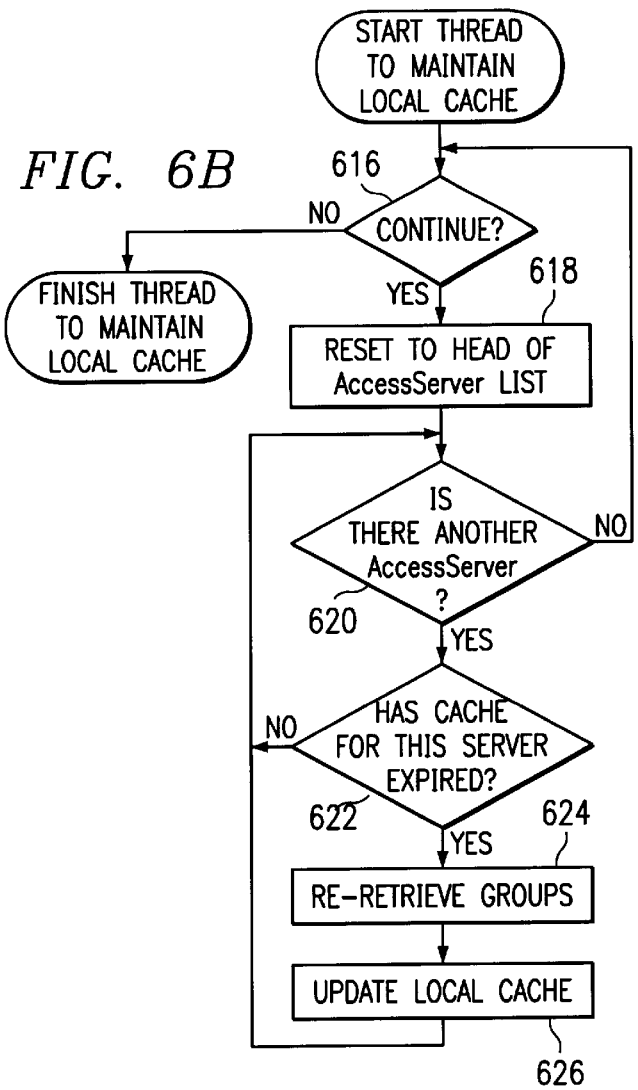
FIGS. 6A–6B show a flowchart for the gathering of access information in accordance with a preferred embodiment of the present invention.
Figure 6A:
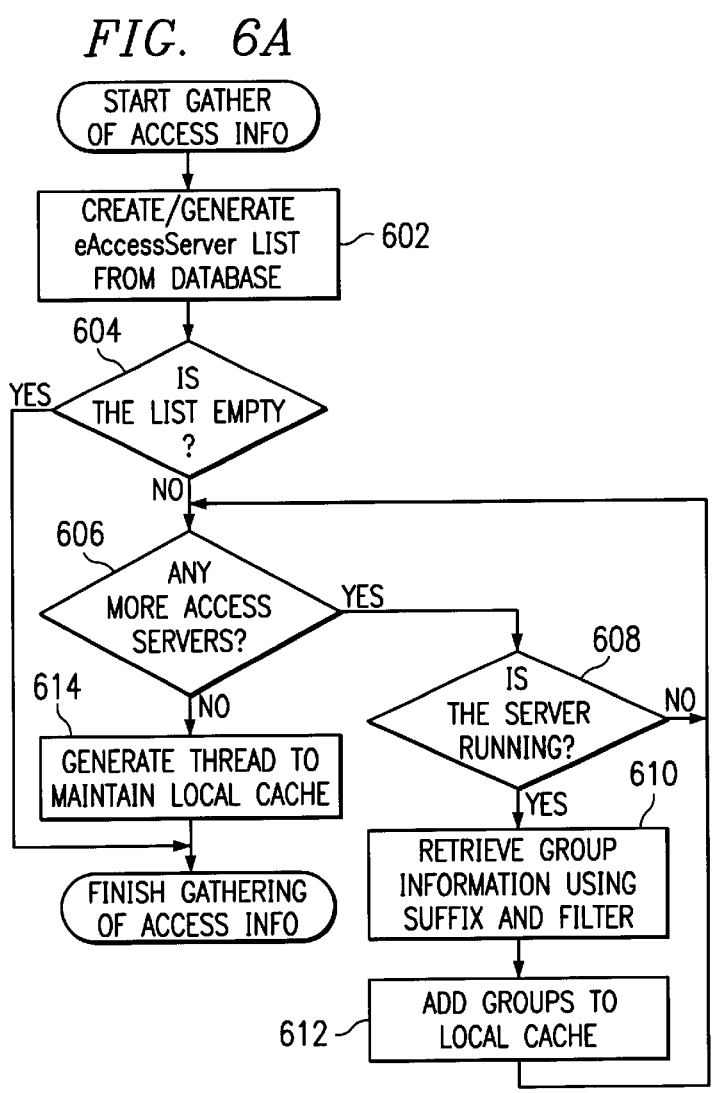

With reference now to FIGS. 6A–6B, a flowchart shows a process for gathering access information in accordance with the preferred embodiment of the invention. When Server1 initializes, it queries the local database for all objects of type "eAccessServer". For each of these objects, server1 will contact the server defined in the object. Server1 binds to server2 as the userDN specified in the object, with the provided password. Server1 then executes a search against server2 with the specified query. This retrieves all the groups from server2 that can be used for access control purposes. The results of this query are cached locally at server1.

Referring to FIG. 6A, an eAccessServer list is created or generated from the database (step 602). The process then loops through the entries in the list. If the list is empty (step 604), then the gathering of access information is complete. If the list is not empty, there is a check if there are any more access servers to be processed in the list (step 606). If there is an access server, then there is a check if the server is running (step 608). If the server is not running, control returns to step 606 where a check is performed for more access servers to be processed in the eAccessServer list. If the server is running, then an LDAP suffix and search filter are used to retrieve the group information (step 610). This group information is then added to the local cache (step 612), and control returns to step 606 where a check is performed for more access servers.

Returning to decision 606, if there are no more access servers, then a separate thread is generated to maintain the local cache (step 614). The operation of this thread is shown in steps 616 through 626 of FIG. 6B.

Periodically, this access control result set needs to be updated to ensure consistency with the defining group server. There are multiple methods of achieving this. One technique is a caching mechanism using the standards-defined cache Object. Within the cache Object is an attribute that describes "time to live" for a given cached entry. After the time limit has been reached, the client will automatically update the information. The server will use the client to query other servers. By creating cache objects, Server1 can very easily maintain the cached information by utilizing the function available in the client library.

Servers that do not provide client-side caching support can implement the functionality at the server level. First, one can simply start a thread that reissues the query at a specified time interval. This interval can be either a set interval for all defined groupServers, or the interval can be configurable. For example, within the eAccessGroupServer object, an attribute can keep track of how often the server should be re-queried. Servers with static data can therefore be queried less often than those with data that is expected to change more frequently.

A second method for updating this cached information uses an LDAP extension feature called "event notification". In this scenario, both servers must support event notification. Server1 registers with Server2 to receive a particular type of event. For example, if Server2 is a SecureWay directory, Server1 could register to receive events which affects objects of class "eAccessGroup". So, if membership in a group changes, Server1 is notified of the change and can update the local cache accordingly.

Another method for keeping this cache updated uses a queriable server change log. This method is more cumbersome for Server1 then event notification, but will also provide the desired results. If Server2 maintains a change log which can be queried using the LDAP protocol, Server1 can periodically query the change log on Server2 for the updates since the last query. Server1 can then check to see if any of the updates affect the group DNs maintained in the local cache. If there are updates, then the local cache is updated accordingly.

Referring now to FIG. 6B, a continue flag is checked (step 616), and the thread is stopped if the flag is not set. Some activities that might cause the flag not to be set could be that the server received a SIGTERM (signal termination) or SIGKill (signal to kill) signals. If the flag is set, then the list of access servers is processed with the pointer into the list reset to the head of the list (step 618). There is a check for another eAccessServer in the list to be processed (step 620). If there is none, control transfers back to the check of the continue flag in step 616. If there is another eAccessServer to be processed, there is a check for whether the cache for this server has expired or not (step 622). If the cache has not expired, no processing is needed, and control returns to step 620 to check the next eAccessServer. If the server's cache has expired, then the groups have to be retrieved again (step 624), and the local cache updated (step 626). Once this is completed, control transfers to step 620 to process the next eAccessServer in the list.

With reference now to FIG. 7, a flowchart shows the bind procedure with a local groups cache in accordance with the preferred embodiment of the invention. This flowchart is an expansion of step 506 in FIG. 5. After the bind operation is commenced (step 702), there is a check of whether the user is local or not (step 704). This is determined by whether the user is present in the local database. If the user is local, then the local groups are gathered (step 706) by querying the local database for a membership attribute that contains the bindDN. The local cache is then checked for eAccessServer groups (step 708). This is the cache created by the process described in FIGS. 6A–6B. The set of groups associated with the user is now the combined set of groups from the local database as well as the local cache from remote servers.

Returning to decision 704, if the user is not local, then the eAccessServer list is retrieved (step 710). The servers in the eAccessServer list are checked one-by-one. If there are no more AccessServers to check (step 712), then the bind attempt is rejected (step 714). If there is another eAccessServer to be checked, then there is a check if "authenticate" is set to TRUE (step 716). If it is not TRUE, control returns to step 712 and the next eAccessServer is processed. If the "authenticate" flag is TRUE, then the user attempts to authenticate to this server (step 718). If this is not possible, control returns to step 712, and the next eAccessServer is processed. However, if it is possible to authenticate to this server, then control transfers to steps 706 and 708 where local groups are gathered and the local cache is processed. In summary, if the user is local, the access servers are checked one-by-one until the first server is found with the authenticate" flag set to TRUE that can authenticate the user to this server.

This approach considerably reduces both administrative overhead and space required to maintain a truly distributed directory. The amount of disk space needed to maintain a complete user registry on each LDAP server would be very large. Using the customizable filter, the administrator can query only for those definitions which are important to a particular server. For instance, if a user registry is shared across multiple applications, and a server caters only to one of those applications, it does not need to know about users other then for its own application.

The technique presented here can be expanded to encompass any resource definition which must be used across LDAP servers. For instance, an administrator of a particular server might establish a set of Named Access Control Links (ACL). These named ACL definitions could be used by any other server which has established this trust relationship.

Another example of expanding this process might be to have the network administrator define and maintain policy on a particular LDAP server. This policy can then be queried by other LDAP servers. The other servers might have the logic to grant or deny requests based on characteristics such as IP addresses. The LDAP servers do not need to have local copies of this policy definition. The administrator maintains the information in one location, and other servers query the information at start up and use the policy definitions to govern incoming requests.

The methods described here greatly improve the feasibility of turning LDAP into a truly distributed directory. It provides an easily configurable solution for maintaining a single source of information, and a single administration point for that information. It encourages server interoperability by not restricting any part of the implementation to a specific server characteristic.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media such a floppy disk, a hard disk drive, a RAM, and CD-ROMs and transmission-type media such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing access to non-local information in Lightweight Directory Access Protocol (LDAP) directories on a plurality of servers in a distributed data processing system, the method comprising the computer-implemented steps of:

maintaining local access control data at a first server in the plurality of servers, wherein the local access control data provides access control information for the first server;

generating a non-local access server list at the first server in the plurality of a servers, wherein the non-local access server list specifies a set of servers in the plurality of servers;

obtaining directory entries from a non-local server specified in the non-local access server list; and applying an LDAP operation received by the first server against the obtained directory entries and the local access control data.

2. The method of claim 1, wherein the step of obtaining directory entries further comprises:

querying, by the first server using an LDAP search request, each server in the non-local access server list; receiving an LDAP search response from each queried server; and caching directory entries from the LDAP search response received from each queried server.

3. The method of claim 2 further comprises:
updating the cached directory entries.

4. The method of claim 1 wherein the non-local access server list is stored in an LDAP directory entry on the first server.

5. The method of claim 1 wherein the step of generating a non-local access server list further comprises:
searching a directory on the first server for directory entries comprising access server objects.

6. The method of claim 2 wherein the LDAP search request comprises a customizable LDAP search filter.

7. The method of claim 3 wherein the step of updating the cached directory entries further comprises:
re-querying each server in the non-local access server list after a predetermined time period.

8. The method of claim 3 wherein the step of updating the cached directory entries further comprises:
issuing periodic queries by a server-side thread.

9. The method of claim 3 wherein the step of updating the cached directory entries further comprises:
receiving event notification from each server in the non-local access server list.

10. The method of claim 3 wherein the step of updating the cached directory entry, further comprises:
querying a service change log on each server in the non-local access server list.

11. The method of claim 1 further comprising:
receiving a request to authenticate a user with a distinguished name at the first server;
searching the obtained directory entries anti the local access control data for the distinguished name; and
in response to locating the distinguished name in the obtained directory entries or the local access control data, authenticating the user to each server in the non-local access server list.

12. The method of claim 2 wherein the cached directory entries and the local access control data comprise group membership information for a group of users.

13. A data processing system for managing access to non-local information in Lightweight Directory Access Protocol (LDAP) directories on a plurality of servers in a distributed data processing system, the data processing system comprising:
maintaining means for maintaining local access control data at a first server in the plurality of servers, wherein the local access control data provides access control information for the first server;
generating means for generating a non-local access server list at the first server in the plurality of servers, wherein the non-local access server list specifies a set of servers in the plurality of servers;
obtaining means for obtaining directory entries from a non-local server specified in the non-local access server list; and
applying means for applying an LDAP operation received by the first server against the obtained directory entries and the local access control data.

14. The data processing system of claim 13 wherein the obtaining means for obtaining directory entries From a non-local server specified in the non-local access server, list further comprises:
querying means for querying, by the first server using an LDAP search request, each server in the non-local access server list;
receiving means for receiving an LDAP search response from each queried server; and
caching means for caching directory entries from the LDAP search response received from each queried server.

15. The data processing system of claim 14 further comprises:
updating means for updating the cached directory entries.

16. The data processing system of claim 13 wherein the non-local access server list is stored in an LDAP directory entry on the first server.

17. The data processing, system of claim 13 wherein the generating means for generating a non-local access server list further comprises:
searching means for searching a directory on the first server for directory entries comprising access server objects.

18. The data processing system of claim 14 wherein the searching means for a LDAP search request comprises a customizable LDAP search filter.

19. The data processing system of claim 15 wherein the updating means for updating the cached directory entries further comprises:
re-querying means for re-querying each server in the non-local access server list after a predetermined time period.

20. The data processing system of claim 15 wherein the updating means for updating the cached directory entries further comprises:
issuing means for issuing periodic queries by a server-side thread.

21. The data processing system of claim 15 wherein the updating means for updating the cached directory entries further comprises:
receiving means for receiving event notification from each server in the non-local access server list.

22. The data processing system of claim 15 wherein the updating means for updating the cached directory entries further comprises;
querying means for querying a service change log on each server in the non-local access server list.

23. The data processing system of claim 13 further comprising:
receiving means for receiving a request to authenticate a user with a distinguished name at the first server;
searching means for searching the obtained directory entries and the local access control data for the distinguished name; and
authenticating means for authenticating the user to each server in the non-local access server list, in response to locating the distinguished name in the obtained directory entries or the local access control data.

24. The data processing system of claim 14 wherein the cached directory entries and the local access control data comprise group membership information for a group of users.

25. A computer program product in a computer-readable medium for managing, access to non-local information in Lightweight Directory Access Protocol (LDAP) directories on a plurality of servers in a distributed data processing system, the computer program product comprising:
instructions for maintaining local access control data at a first server in the plurality of servers, wherein the local access control data provides access control information for the first server;

instructions for generating a non-local access server list at the first server in the plurality of servers, wherein the non-local access server list specifies a set of servers in the plurality of servers;

instructions for obtaining directory entries from a non-local server specified in the non-local access server list; and instructions for applying an LDAP operation received by the first server against the obtained directory entries and the local access control data.

26. The computer program product of claim 25 wherein the instructions for obtaining directory entries from a non-local server specified in the non-local access server list further comprises:

instructions for querying, by the first server using an LDAP search request, each server in the non-local access server list;

instructions for receiving an LDAP search response from each queried server; and instructions for caching directory entries from the LDAP search response received from each queried server.

27. The computer program product of claim 26 further comprises:

instructions for updating the cached directory entries.

28. The computer program product of claim 25 wherein the non-local access server list is stored in an LDAP directory entry on the first server.

29. The computer program product of claim 25 wherein the instructions for generating a non-local access server list further comprises:

instructions for searching a directory on the first server for directory entries comprising access server objects.

30. The computer program product of claim 26 wherein the instructions for a LDAP search request comprises customizable LDAP search filter.

31. The computer program product of claim 27 wherein the instructions for updating the cached directory entries further comprises:

instructions for re-querying each server in the non-local access server list after a predetermined time period.

32. The computer program product of claim 27 wherein the instructions for updating the cached directory entries further comprises:

instructions for issuing periodic queries by a server-side thread.

33. The computer program product of claim 27 wherein the instructions for updating the cached directory entries further comprises:

instructions for receiving event notification from each server in the non-local access server list.

34. The computer program product of claim 27 wherein the instructions for updating the cached directory entries further comprises:

instructions for querying a service change log on each server in the non-local access server list.

35. The computer program product of claim 25 further comprising:

instructions for receiving a request to authenticate a user with a distinguished name at the first server;

instructions for searching the obtained directory entries and the local access control data for the distinguished name; and instructions for authenticating the user to each server in the non-local access server list, in response to locating the distinguished name in the obtained directory entries or the local access control data.

36. The computer program product of claim 26 wherein the cached directory entries and the local access control data comprise group membership information for a group of users.

* * * * *

UNITED STATES PATENT AND TRADEMARK OFFICE
CERTIFICATE OF CORRECTION

PATENT NO. : 6,708,170 B1
APPLICATION NO. : 09/460849
DATED : March 16, 2004
INVENTOR(S) : Byrne et al.

It is certified that error appears in the above-identified patent and that said Letters Patent is hereby corrected as shown below:

Col. 3, line 46: after "102" delete "along with storage units 106 and 122".

Col. 11, line 26: after "directory" delete "entry" and insert --entries--.

Col. 11, line 32: after "entries" delete "anti" and insert --and--.

Col. 11, line 61: after "entries" delete "From" and insert --from--.

Col. 11, line 62: after "access server" delete ",".

Col. 12, line 58: after "managing" delete ",".

Col. 13, line 34: after "comprises" insert --a--.

Signed and Sealed this

Fifth Day of December, 2006

JON W. DUDAS
*Director of the United States Patent and Trademark Office*